United States Patent
Doshi et al.

(10) Patent No.: US 12,058,119 B2
(45) Date of Patent: Aug. 6, 2024

(54) AUTOMATIC ESCALATION OF TRUST CREDENTIALS

(71) Applicant: Intel Corporation, Santa Clara, CA (US)

(72) Inventors: Kshitij Arun Doshi, Tempe, AZ (US); Francesc Guim Bernat, Barcelona (ES); Kapil Sood, Portland, OR (US); Tarun Viswanathan, El Dorado Hills, CA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 17/127,852

(22) Filed: Dec. 18, 2020

(65) Prior Publication Data

US 2021/0152543 A1    May 20, 2021

(51) Int. Cl.
*H04L 9/40* (2022.01)
*G06N 7/01* (2023.01)

(52) U.S. Cl.
CPC .......... *H04L 63/0807* (2013.01); *G06N 7/01* (2023.01); *H04L 63/102* (2013.01); *H04L 63/105* (2013.01); *H04L 63/18* (2013.01)

(58) Field of Classification Search
CPC .................................................. H04L 63/0807
See application file for complete search history.

(56) References Cited

U.S. PATENT DOCUMENTS

| | | | |
|---|---|---|---|
| 2015/0365403 A1* | 12/2015 | Counterman | H04L 63/102 726/9 |
| 2016/0044040 A1* | 2/2016 | Caffary, Jr. | H04L 9/30 726/4 |
| 2018/0314954 A1* | 11/2018 | Subramanian | G06N 5/04 |
| 2021/0152543 A1* | 5/2021 | Doshi | H04L 63/102 |
| 2021/0273937 A1* | 9/2021 | Begun | H04L 63/10 |

* cited by examiner

*Primary Examiner* — Ponnoreay Pich
(74) *Attorney, Agent, or Firm* — Schwegman Lundberg & Woessner, P.A.

(57) ABSTRACT

Systems and techniques for automatic escalation of trust credentials are described herein. Requestor data may be received that describes workloads of a requestor. A set of trust credentials may be determined by using an escalation prediction model to evaluate the requestor data. The multi-access token may be assembled from the set of trust credentials. The multi-access token may be transmitted to an information provider to fulfill a request of a requestor.

24 Claims, 11 Drawing Sheets

AUTOMATIC ESCALATION OF TRUST CREDENTIALS

TECHNICAL FIELD

Embodiments described herein generally relate to computer security and, in some embodiments, more specifically to automatic escalation of trust credentials.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office, a vehicle such as a car/bus/train/etc., a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, machine learning/artificial intelligence services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and network function services for example security services, and applications at locations closer to the edge of the network.

Multi-tenant edge networks allow access to a variety of resources that may follow an end user device as the device moves through the network. Information may be secured by a variety of security layers that represent security perimeters. For example, a resource provided by one information provider may be freely accessible to devices registered to its network while a heightened authentication process may be used to provide access to devices that are not registered to its network. On-demand authentication escalation may increase latency so it may be desired to pre-escalate clients to reduce latency from security escalation procedures.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
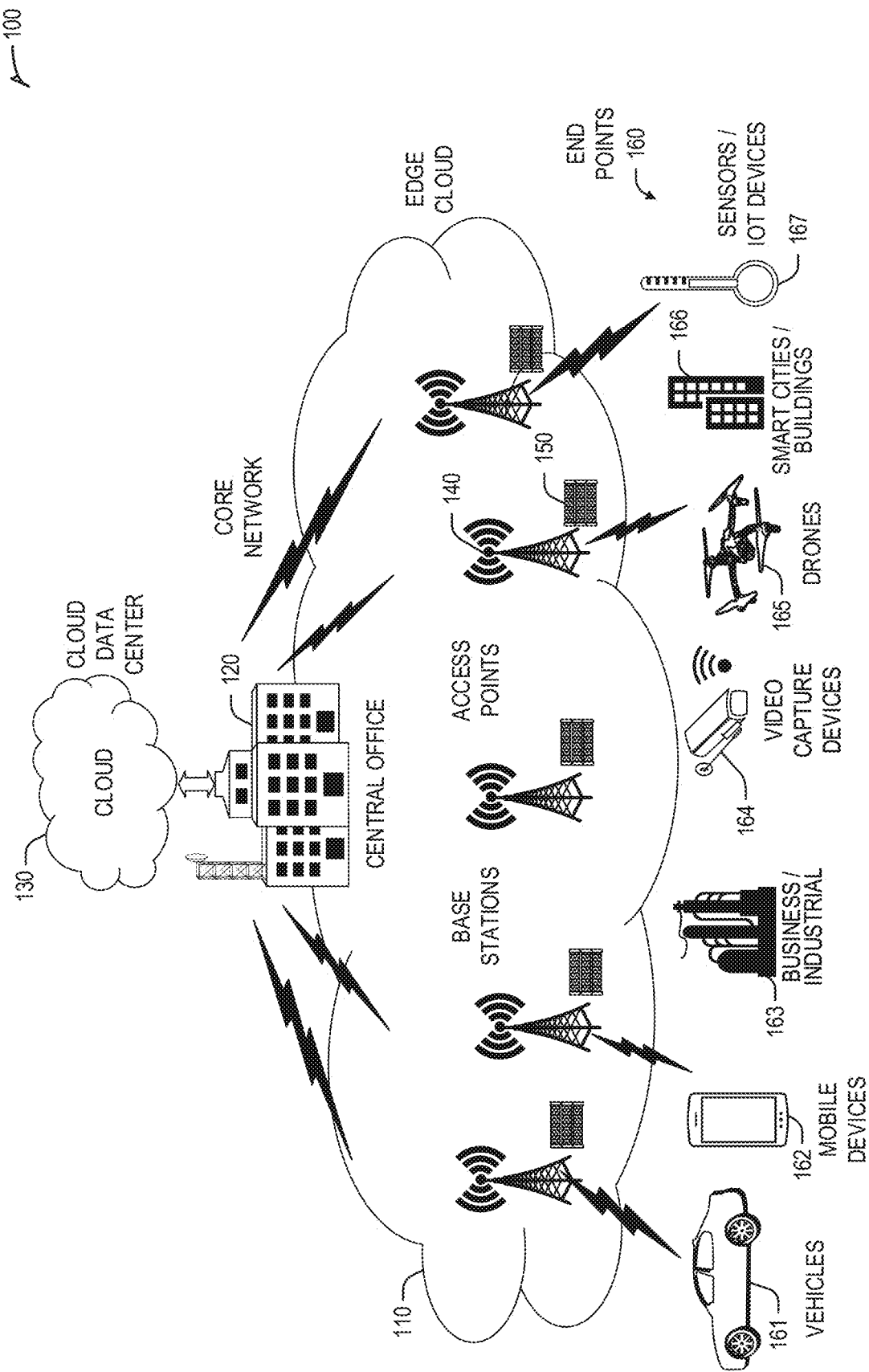
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
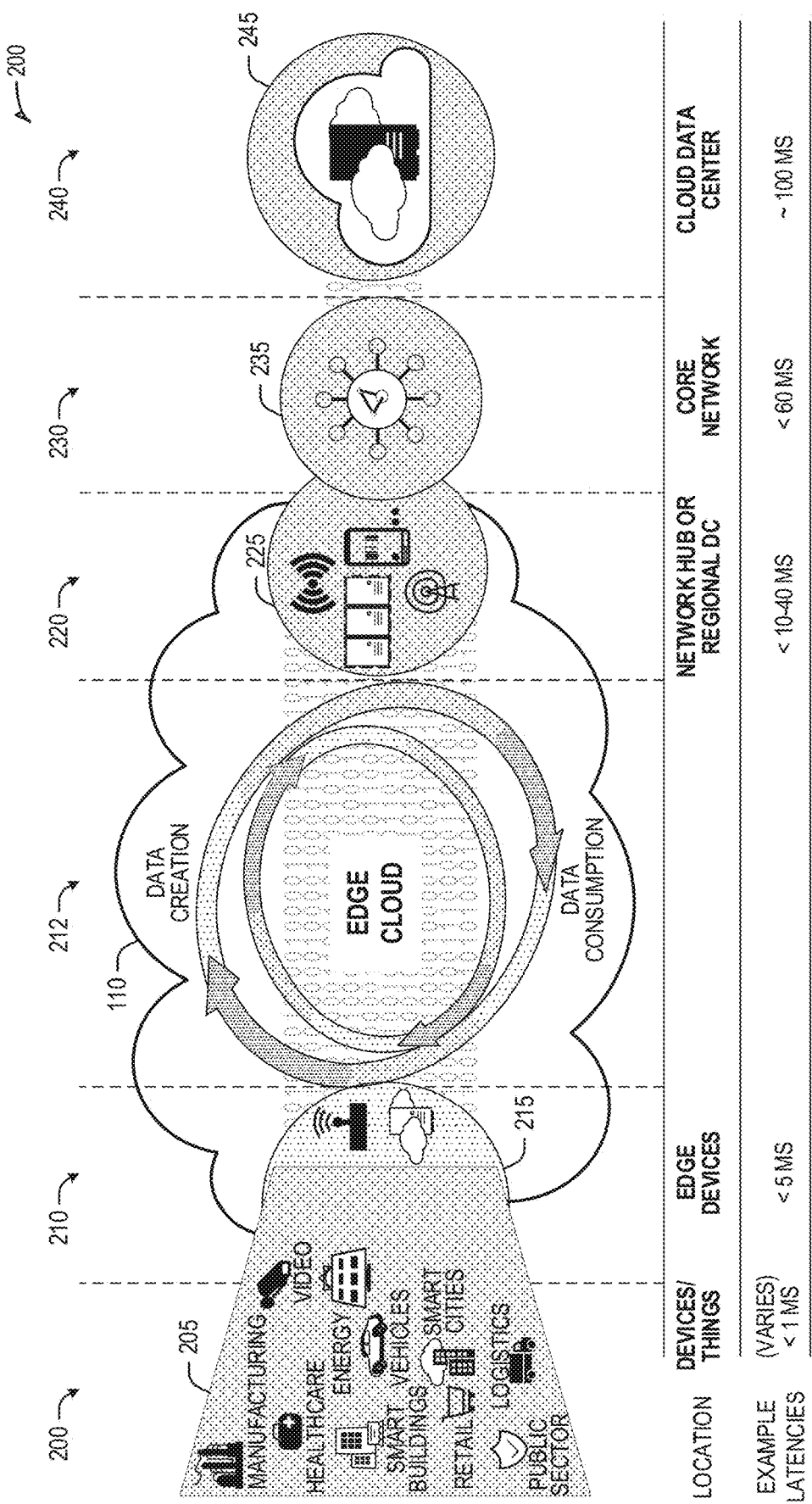
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge". "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS). Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs. DC power inputs. AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
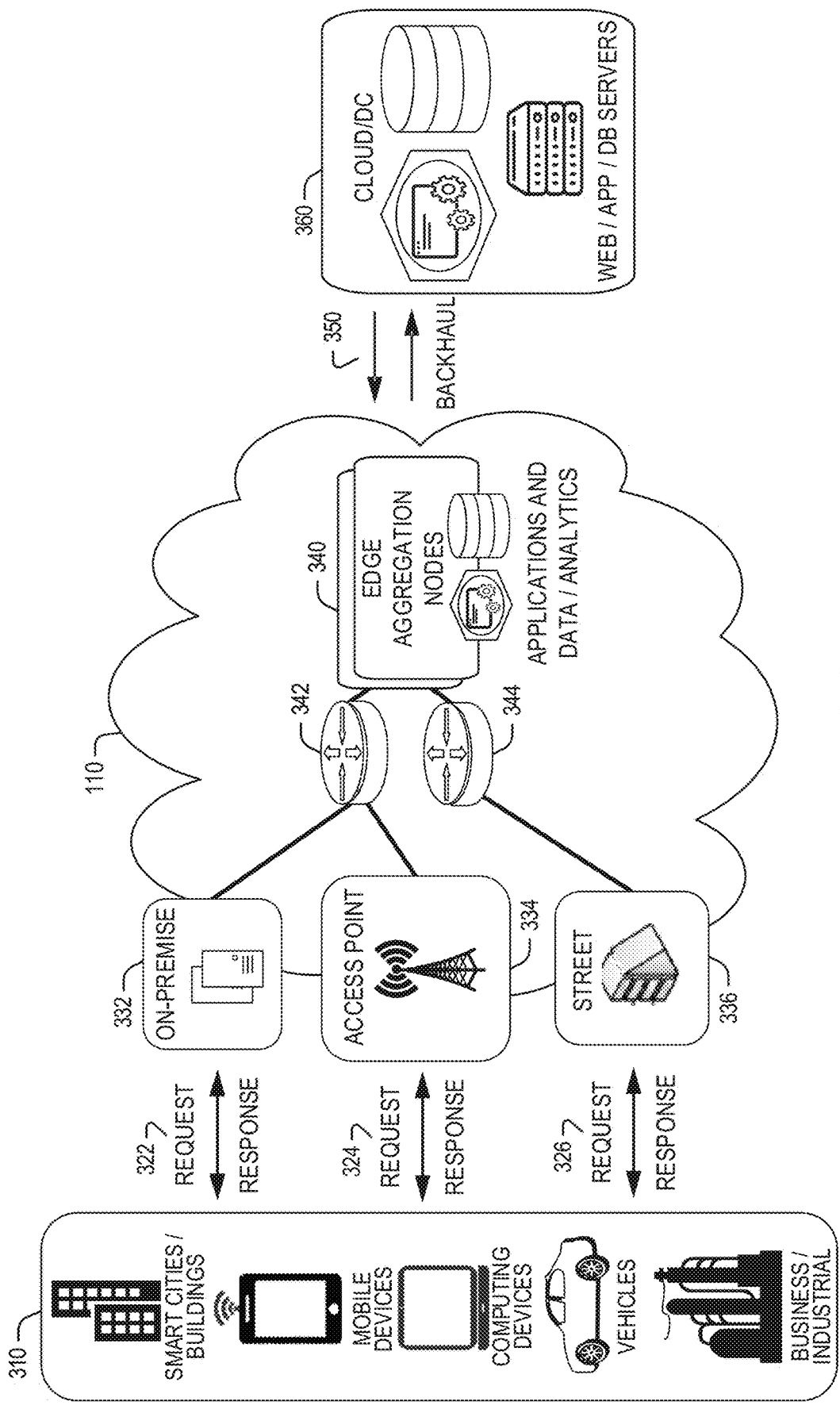
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
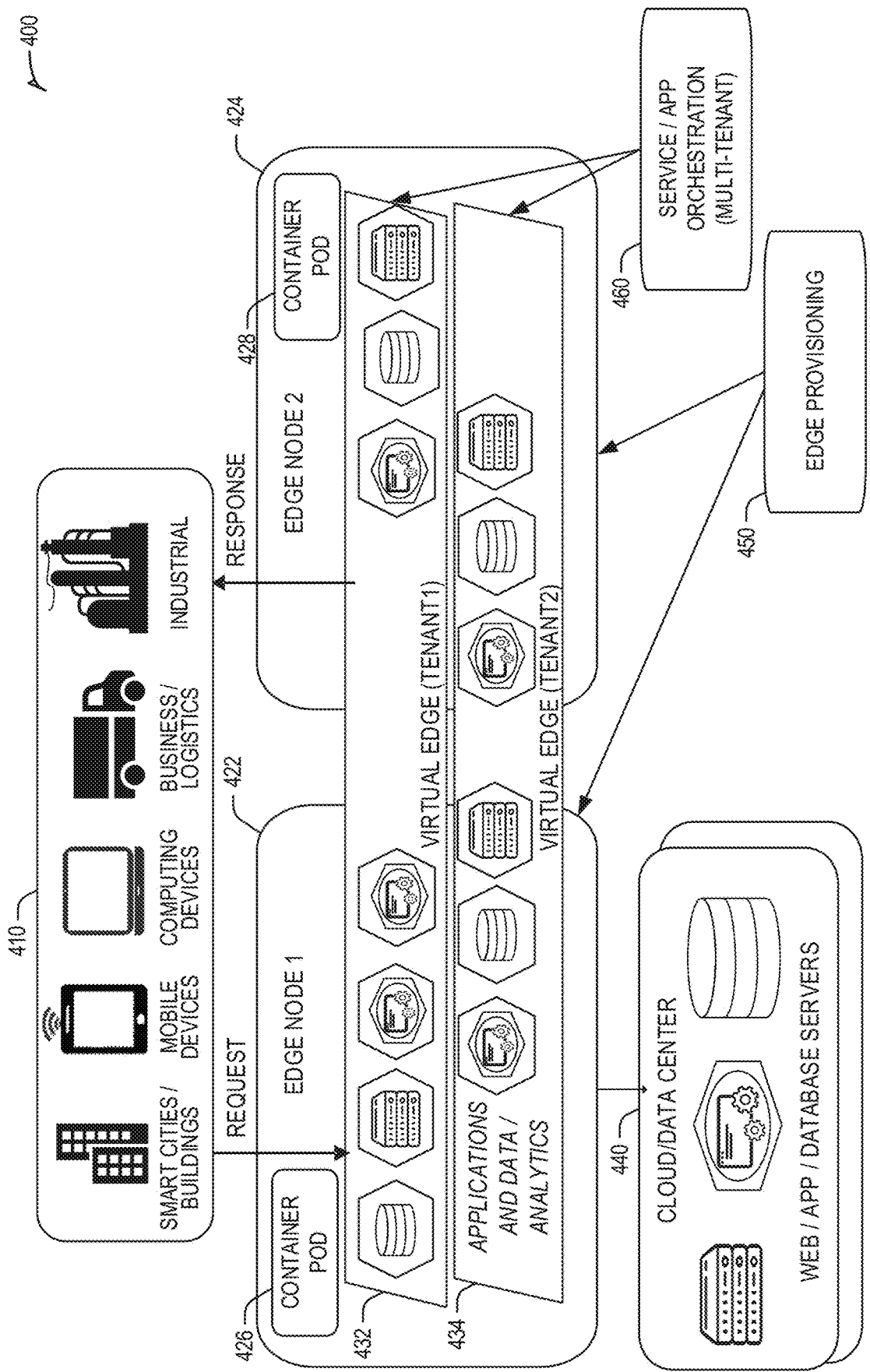
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines. Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
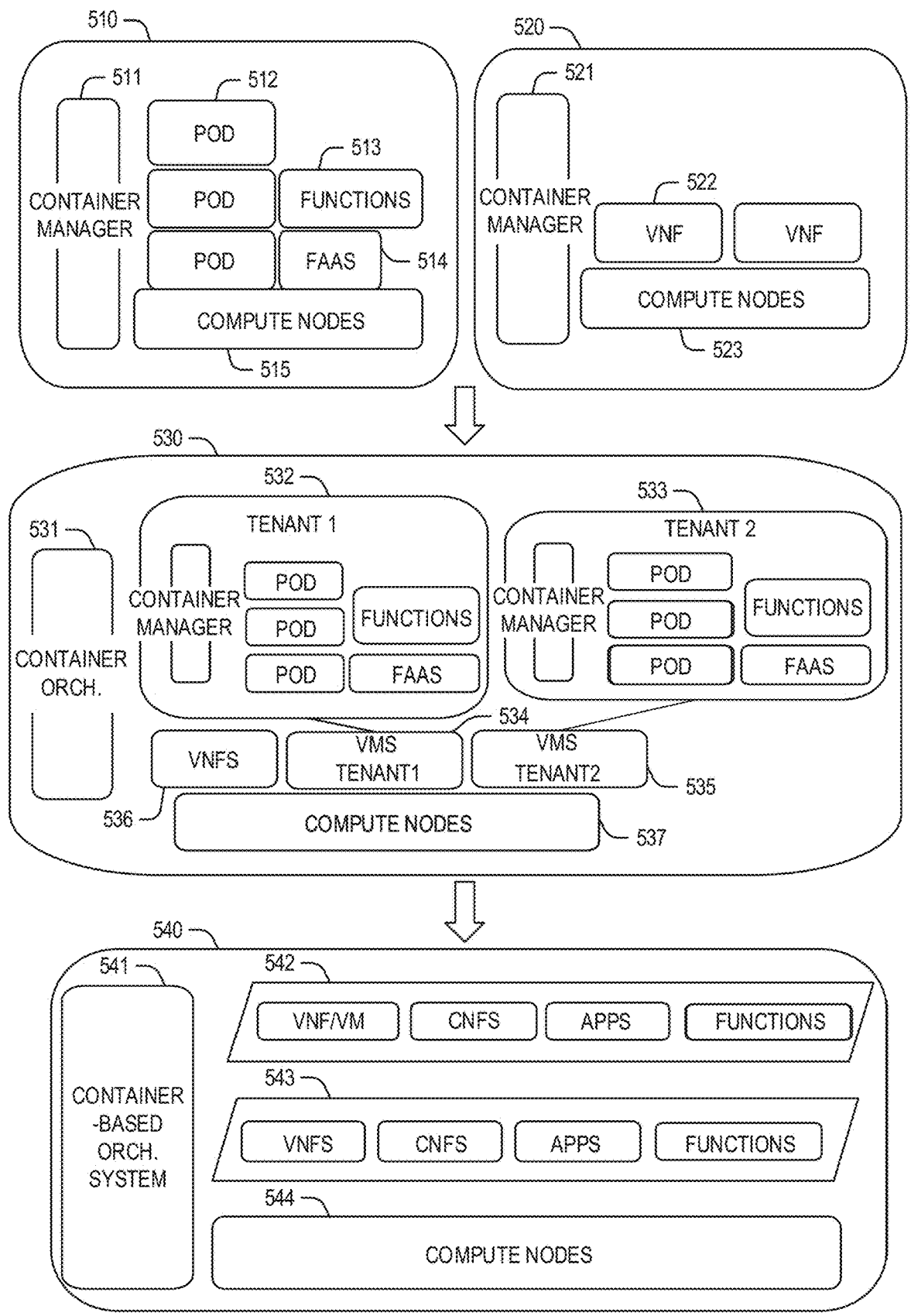
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs. Containers, and Functions equally in terms of application composition (and resulting applications are combinations of these three ingredients). Each ingredient may involve use of one or more accelerator (FPGA ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
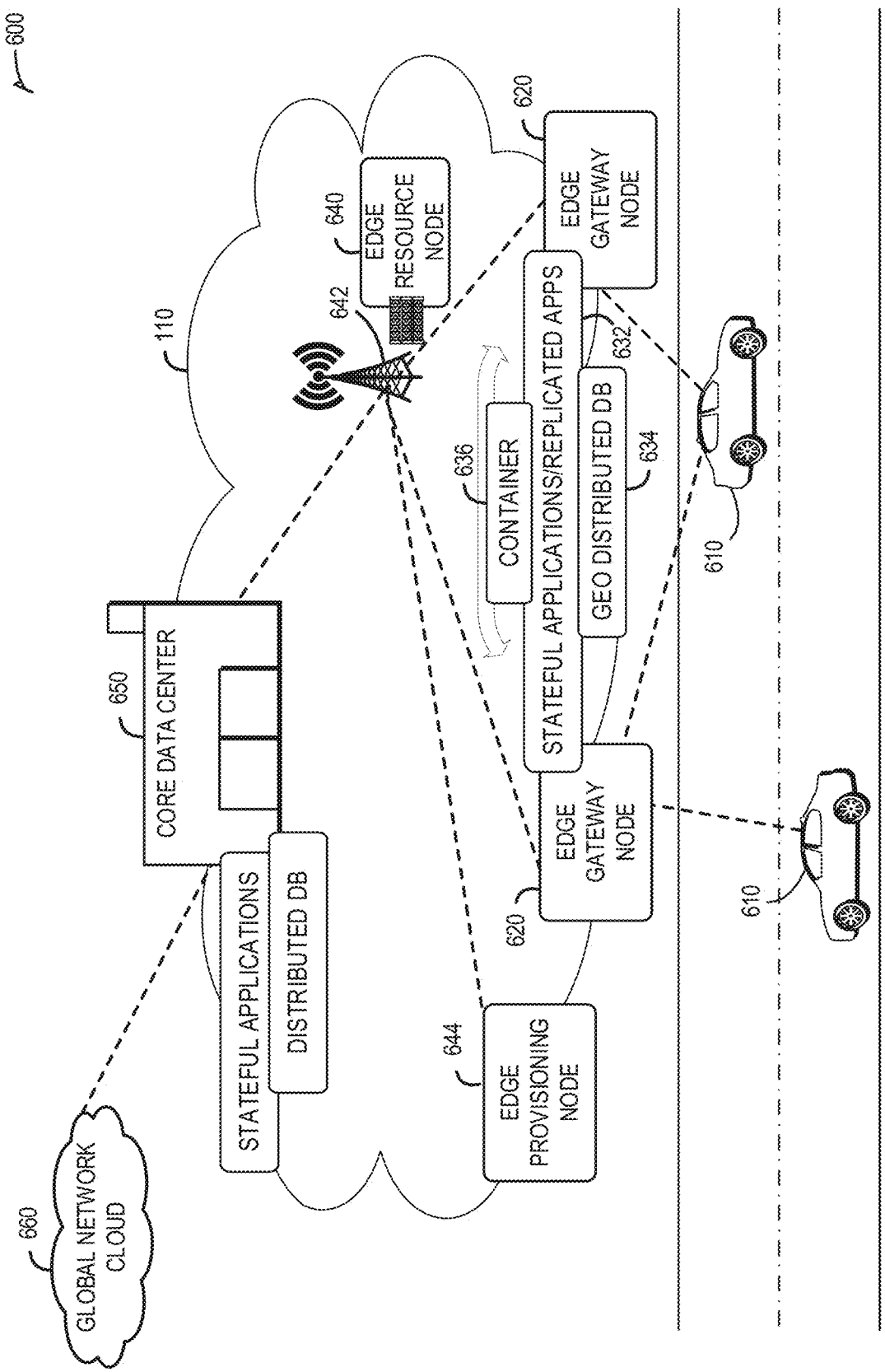
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
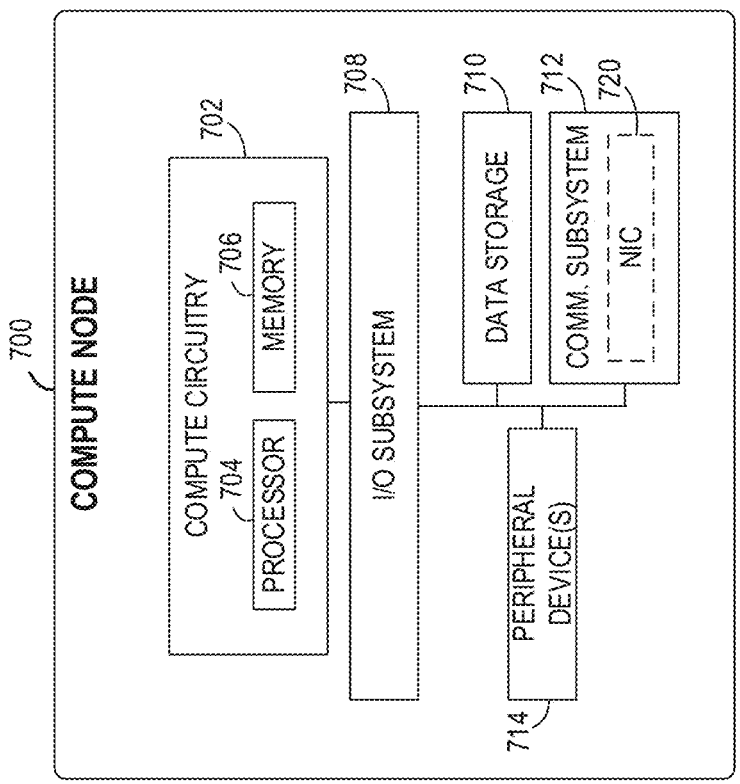
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 40 or 50 standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
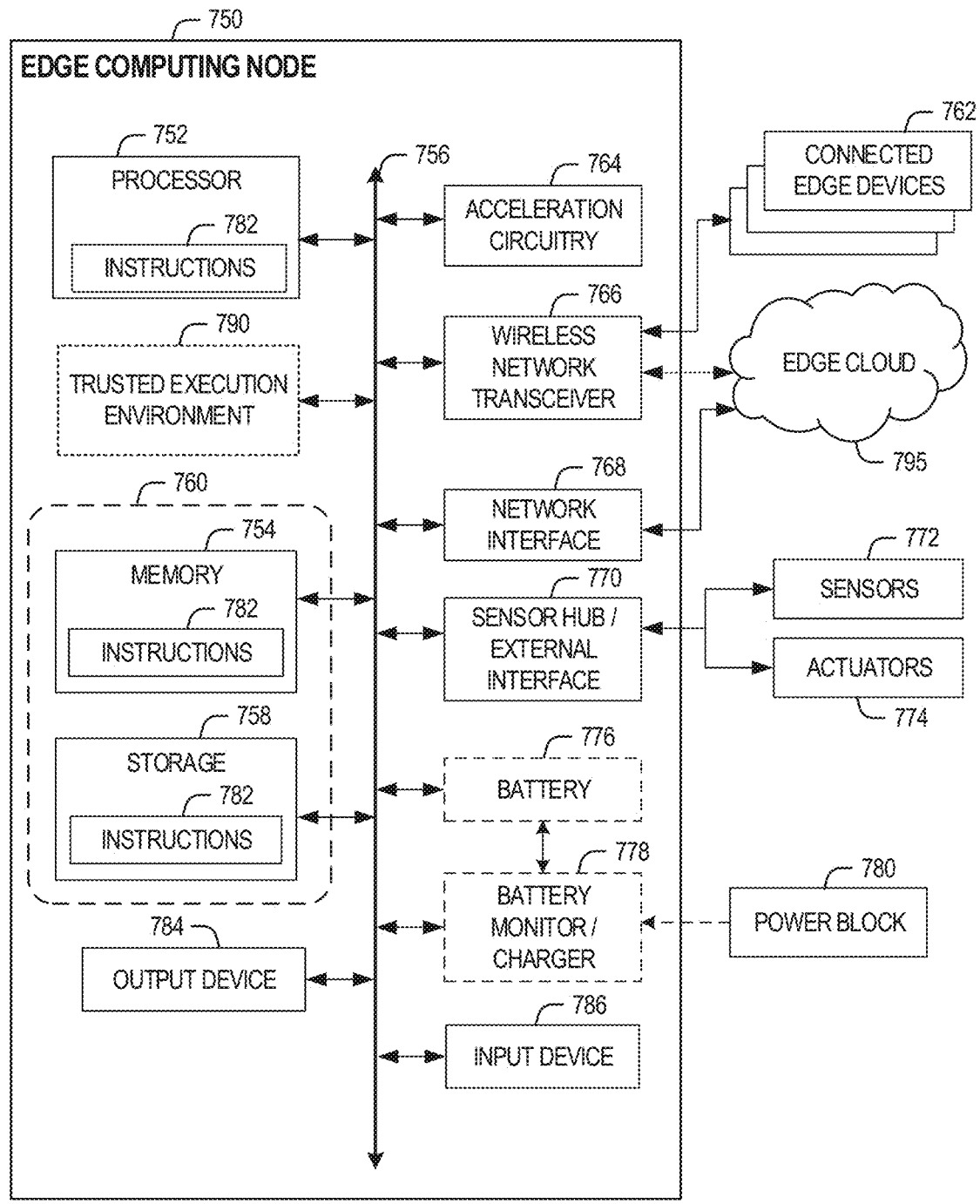
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™ an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies. Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM. JESD79-2F for DDR2 SDRAM. JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory. NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx). PCI express (PCIe), or any number of other technologies. The interconnect 756 may be a proprietary bus, for example, used in an SoC based system. Other bus systems may be included, such as an Inter-Integrated Circuit (12C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN). DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service: or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium. or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® Trust-Zone® hardware security extensions. Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
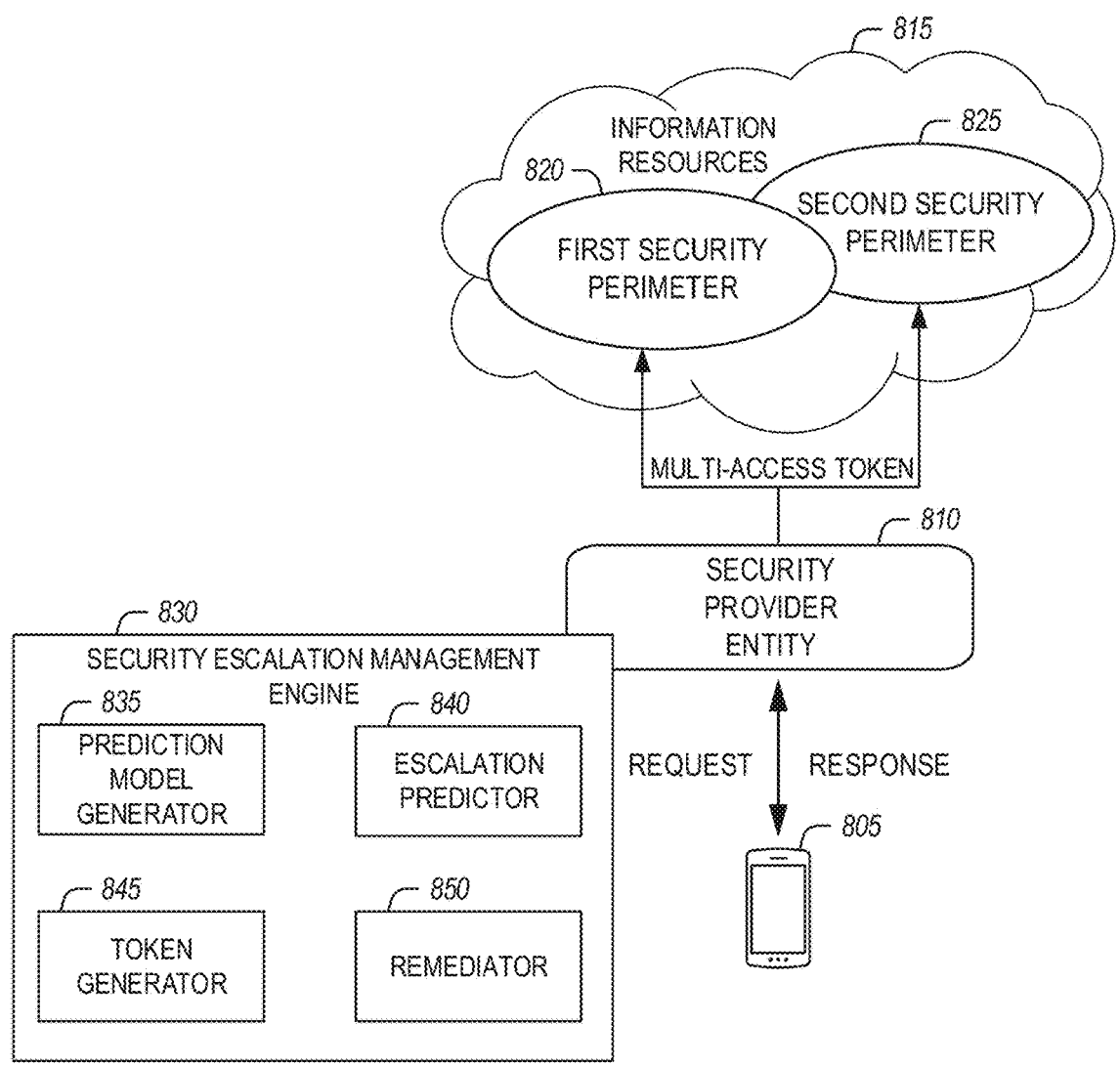
FIG. 8 is a block diagram of an example of an environment and a system for automatic escalation of trust credentials, according to an embodiment.

FIG. 8 is a block diagram of an example of an environment 800 and a system 830 for automatic escalation of trust credentials, according to an embodiment. FIG. 8 may be representative of security operations occurring in the edge computing environments as described in FIGS. 1 through 6 and FIGS. 7A and 7B.

The environment 800 includes a requestor 805 (e.g., a client device, an edge device, etc.), security provider entity 810 (e.g., an edge node, role, etc.), and information resources 815 (e.g., a collection of information providers in a cloud network, etc.). The information resources 815 may include a variety of security perimeters (e.g., access control layers, etc.) including a first security perimeter 820 and a second security perimeter 825. The security provider entity 810 may be communicatively coupled (e.g., via a wired network, wired network, cellular network, shared bus, etc.) to the system 830. In an example, the system is a security escalation management engine. The system 830 may include a variety of components including a prediction model generator 835, an escalation predictor 840, a token generator 845, and a remediator 850.

Trust escalation may add to latency of transactions. When escalation is performed just-in-time, a number of communications and processing steps may need to occur, causing latency to be adversely affected. Therefore, it may be advantageous to more accurately predict when escalation will be necessary in order to start escalation operations before a secured resource is accessed. When trying to complete a transaction as quickly as possible, it is helpful to know in advance that higher security will be needed to access certain resources during the transition. In an example, this prediction may be done at an entity of the edge computing environment. Predictions may be performed when crossing between different providers for the purpose of consuming a service provided by two domain providers. The known domain provider (e.g., a trusted or home domain provider) may cooperate with the foreign domain provider to complete the security escalation process.

Many computing operations may authenticate using a password, biometrics, or other security implementation to access a particular information resource on a storage medium such as memory, a disk, a distributed object store, etc. Access is graded to the amount of need and depending on various properties of the information that is being accessed. For example, a document that lists the names and office phone numbers of employees of a first company may be freely accessible to all employees of the first company but may be restricted from being accessible to employees of a second company. Information that is being accessed may be static (e.g., present as objects on some physical or virtual storage medium) or may be dynamically generated on demand by extraction, transformation, and inferences applied on some other precursor information.

For dynamically generated information: (a) access to precursor information may be graded according to need, and according to various properties of the precursor information; and (b) access to extraction, transformation, and inferencing procedures or mechanisms which obtain the requested information from precursor information may be alternatively or additionally graded according to need for and properties of the requested information.

As used herein, an information resource may refer inclusively to: (A) static information present as a structured or unstructured data object, stored on a logical or physical storage medium. (B) dynamic information that may be obtained by performing computations or transformations based on some precursor control or memory inputs, and (C) to procedures or mechanisms that may produce the dynamic information of (B).

It is common practice to represent or encode authentication information identifying an accessor of information into a token-such as the accessor's biometric information, their digital certificate, etc. It is also a common practice to encode various security control parameters that are associated with an accessor authenticated through the use of a token, either into the token itself or by deriving a second token so that a token compactly represents an identity and the access rights available to that identity within an access control perimeter. While these common practices may generate the tokens, they may not generate a multi-access token as the result of a prediction of authentication information that may be used by a user in the near future. The systems and techniques discussed herein provide an improved multi-access token before authentication is used which reduces potential latency caused by just-in-time token generation.

In general, the requestor 805 may be entitled to a collection of access rights over objects in the first security perimeter 820. For example, an employee of a company may freely access a shared web repository whose contents are available to all employees of the company. The requestor 805 may also be entitled to a different collection of access rights over objects in the second security perimeter 825. In another example, information or programs for generating information may be accessed which are located in a repository of the second company that is linked to the first company under an arrangement between the first and the second company. The employee of the first company, when accessing the information or programs, may be limited in the types and numbers of accesses, types, and properties of the resources accessed. The durations over which such accesses may be permitted may also be limited. Accordingly, to facilitate simultaneous access to resources that may not be all contained within one security perimeter, the token generator 845 may encode into a first token, or into a collection of tokens identified by a second token, a collection of identities and access rights available under those identities.

The first or the second token may be consulted in multiple security perimeters such as the first security perimeter 820 and the second security perimeter 825. For example, first or second tokens may be referred to as Multi-provider/Multi-access Edge Trust-credentials (METs). Taken together, such a MET credential (e.g., encoded as a token, javascript object notation (JSON) web token (JWT), concise binary object representation (CBOR) web token (CWT), OAuth2 token, etc.) encodes the rights to access multiple information resources in the course of a computation in a streamlined way with a single token that is translated (e.g., interpreted) in different access control perimeters in different ways. The token structure is a name-value-pair structure that associates an identity with a number of name-value attributes. The token may apply to a device such as a user device, a user, a service, server device, etc. Tokens may be exchanged in remote procedure call (RPC) and representational state transfer (RESTful) hypertext transfer protocol (HTTP)/constrained application protocol (COAP) or other distributed application programming interface (APIs) as a way of providing authentication or authorization context to the API call.

FIG. 8 shows the first security perimeter 820 and the second security perimeter 825. The MET token is used to establish context for which perimeter a device of the requestor 805 will use when accessing edge resources to request execution of tasks of a workload. The token contains requester data which is the set of name-value pairs in the token. The token, according to common web access protocols such as OAuth2, works according to a 3-step protocol. Requestor 805 connects to a web access service such as one that provides user authentication, device authentication, device attestation, or other authorization checking. The access service issues the token (signed by the access service). The requestor 805 performs an API call and includes the token with a service. The service being accessed is one of the first security perimeter 820 or the second security perimeter 825. Access to the perimeter means access to any service that is deployed within the perimeter boundary.

The security provider entity 810 may be the equivalent of the access service in. FIG. 8 shows access from the requestor 805 to the first security perimeter 820 or the second security perimeter 825 going through the security provider entity 810. In an example, a direct connection may be made to a server in the first security perimeter 820 or the second security perimeter 825. Sidebar message exchanges may return the MET Token (labeled Multi-Access Token in FIG. 8).

Contents of the token tag-value attributes depend on how the device of the requestor 805 authenticates to the security provider entity 810.

Attributes may include, by way of example and not limitation: user authentication-user name, user authentication key, length of access grant, device authentication-device name, device authentication key, length of access grant, device Authorization-device name, services accessible, level of access authorized, authorization groups, length of access grant. Attestation-device name, device type, device model, device vendor, device firmware installed, device operational state, device boot state, device root-of-trust capabilities, device revision/version, etc.

Attributes included in the token may include, by way of example and not limitation: security perimeter name, security perimeter discovery services, security perimeter services, security perimeter security levels, security perimeter groups/sub-groups (these may include server clusters, flavor clusters, function-as-a-service (FaaS), platform-as-a-service (PaaS), container pod managers, orchestrators, task schedulers, etc.), security perimeter resources, security perimeter data pools, etc. Some of the above may be only visible after consulting security perimeter discovery services. The token may contain a list of perimeters, groups, sub-groups, resources, services etc. that are an authorization to access security perimeter assets. The token authorizes discovery services to supply route information to available assets.

In an example, the security provider entity 810 may supply a MET token that only authorizes access to the security perimeter discovery service which then interrogates the device further and issues a second token that is specific to the type of access the user can expect from the first perimeter. A second token might be issued related to specific assets of the second perimeter. In so doing, the MET token may be a token of tokens where the attributes are the perimeter specific tokens. This would allow it to be a Multi-Provider aka 'multi-perimeter' edge token.

The protocol for issuing the MET Token may be more sophisticated than shown above because the inclusion of a token within a token requires another layer of token issuance. If T1 refers to the first token that authorizes discovery access to Perimeters P1 and P2. And T2 refers to the token issued by P1 and T3 refers to the token issued by P2. Then the user may request a MET token containing a token of tokens by going back to the security provider entity 810 supplying T1. T2 and T3. In return a T4 token is issued that contains T2 and T3 as attributes of T4.

Interactions between the requestor 805 and the security provider entity 810 may include additional request/response protocol interactions that are specific to the system 830 functions (e.g., provided by the prediction model generator 835, the escalation predictor 840, and the remediator 850) in addition to the token generator 845—token issuance.

Each of these interactions may, according to the intention of the system 830, involve request data that is specific to the request/response protocols of the other functions (e.g., the prediction model generator 835, the escalation predictor 840, and the remediator 850) respectively.

For example a token (Multi-access/multi-provider Edge Token. or MET) of the requester 805 may be translated in different security perimeters such as: In the first security perimeter 820—Requestor 805 identified as ID, accessing information 11 and is permitted. In the second security perimeter 825—Requestor 805 identified as ID1, accessing information 12 and is permitted. In a third security perimeter (not shown)—Requestor 805 identified as proxy ID3, accessing information 3 and is denied. In a fourth security perimeter (not shown)—Requestor 805 identified as proxy ID2, accessing information 14 and is permitted.

The access granting/preventing decisions are made on the basis of the same token with different mapping to exact or proxy identities encoded into the token. The token (MET) serves as a convenient handle for a set of identities and access rights to distributed sources of information for those identities.

Access Levels and Communication Channel Properties

It is common in many forms of access control protocols to place different types of data or program objects into a plurality of access levels or access classes. At the time that the requestor 805 device or computational program initiates an access to a particular information resource, the token or authentication credential may be translated or interpreted (e.g., mapped) to determine whether it maps to a range of access levels within which the information resource is placed. If so, the access may proceed. Further, the access level may also determine various security properties for the communication channel through which the access may proceed.

Information that is considered, for example, highly sensitive, secret, or associated with a high commercial value, may be made available through a channel that employs strong (e.g., 2048-bit key, etc.) end-to-end encryption so that hardware and software intermediaries through whom the information may be routed to the requestor 805 are prevented from obtaining or altering the information.

In an example, information may be considered non-secret but is sent through integrity preserving encoding so that intermediaries may not accidentally or intentionally modify the data without detection. In integrity preserving encoding, the information may not be protected from being decoded, but any attempted or accidental alteration of the encoded information results in a detectable error at the receiver (e.g., the requestor 805) of the information. In another example, information may be considered "low-grade" secret or not requiring high overhead encryption and a smaller encryption key (e.g., 128-bit key, etc.) may be used for its encryption.

Access Levels Across Security Perimeters

An information resource that is accorded a first access level when accessed by principals in the first security perimeter 820 may be accorded a second access level when accessed by principals from the second security perimeter 825. Similarly, the multiple access levels applicable to accesses by principals from respective multiple security perimeters also determines the multiple security properties for the communication channels through which the accesses may proceed.

An information resource in the first security perimeter 820, may thus be associated with different access levels-a home access level L0 for accesses from the first security perimeter 820, a first access level L1 for access from the second security perimeter 825, a second access level L2 for access from a third security perimeter, and so on.

An edge workload/service level objective (SLO) might require compute over several edge nodes (e.g., edge nodes 620, 640, 650, and 660 as described in FIG. 6, etc.) or may require the services of provisioning and management nodes (e.g., edge provisioning node 644 as described in FIG. 6, etc.) to stage the workload execution plan. Each node/service may use authorization in the form of a token where the various levels are associated with the respective edge nodes.

Another dimension of the levels identifies a level of trust of the requestor and the level of trust of the resource manager. A requestor may operate at a less-hardened level of trust such as when it is a common operating system process (e.g. ring-3, etc.) whereas a hardened requestor may be protected using virtualization, enhanced data protection routines, or a security engine (such as field-programmable gate array (FPGA), network interface card (NIC), baseboard management controller (BMC), or other hardened micro controller). Hence a token may have both a horizontal (security perimeters) and vertical (degree of hardening) designation. Therefore, a token could list hardening levels as V and horizontal levels (aka compartments) as H. The token would have sets of V:H values: V1: H1, H2; V2: H2, H3, H4; V3: H1, H4; etc.

The security perimeters may have both a horizontal (e.g., the first security perimeter 820, the second security perimeter 825, etc.) aspect and a vertical aspect. The vertical aspect is not depicted in FIG. 8, but for example, FIG. 7A might describe a processor 704 and a NIC 720 as having high vertical trust (e.g., V3, etc.) and IO subsystem 708 as having lower vertical trust (e.g., V2, etc.). Hence, a token that contains (V3:720,704) privileges would allow the processor and NIC to interact at V3 level privileges. A token that authorizes access to the node 700 might describe access using an even lower vertical trust (e.g., V0, etc.) such that the token might contain (V0: 702,708,712,714, . . . ) which describes access across all the components of the compute node at V0. It is the case that the components of the compute node may be able to switch to more secure modes for example a CPU 704 could switch between a vertical mode V0 and V3 dynamically. This would allow it to satisfy access policies for both (V3: . . . ) and (V0: . . . ) dynamically. This is the context for synthetic identities as each identity may be expressed in terms of its privilege levels. For example. Alice@V0_700, Alice@V1_708. Alice@V2. Alice@V3_704_712, etc. and separate credentials may be issued that assign permissions that align with the synthetic identity as appropriate.

The identity should not be confused with the username, however. If a name 'Alice@V2' were used as the name for an identity that grants V2 permissions, the identity credential would be the authoritative source for which privileges are associated. For example, an identity credential might have two sections Name and Permissions where Name='Alice@V2' and Permission=V2. The identity credential evaluation uses the Permission field to assign privilege not the name field. For example, if the name='Alice@V1' and the Permission=V2 then the privilege granted would be V2. The encoding of V1 in the name might be considered a clerical error but should not be used for access control decisions.

It is advantageous to associate the access levels L1, L2, etc. with synthetic identities P1, P2, etc. Accordingly, the requestor 805 may be permitted to extend their identity for the duration of such access with the synthetic identity Pn if the requestor 805 belongs to a security perimeter Dn and is determined by prior verification to have the ability to access the information resource. For convenience, such an identity may be expressed as R@Pn, to distinguish from other requestor identities S@Pn, T@Pn, etc. also determined by prior verification to have the ability to access the information resource.

The MET credentials for a given principal may encode the different access levels in the different security perimeters through different synthetic identities. Thus, the ability to access an information resource includes determining the identity superposition under which the resource is available to a MET credential and the applicable access level and communication channel security properties.

The superposition is found by listing all the granted permissions in order from highest to lowest to visualize the scope of access. Generally, a security policy is applied that places the highest-level permission at the leaves (leaf nodes) of a graph of resources and lowest level at the root or center of the network topology. That way there is less risk for privilege escalation when a low-level task exits it does not fall into a higher-level environment in which it has not been given access. For example, in FIG. 7A, the IO subsystem 708 is a system bus that every IP block communicates over. The 10 subsystem 708 should have low privilege so that discovery of the other IP blocks is possible without needing to acquire all possible privilege levels. A resource that operates at a high level (e.g., the NIC 720 may operate at V3) may be discovered on a lower level (e.g., V0) but shows that a level V3 is required to execute on the NIC 720.

Examples involving network perimeters may follow a similar approach where the entire edge network might operate at a low privilege level (e.g., V0) and the resources behind concentric perimeters increase in level until a leaf environment (e.g., an enclave inside of a CPU) may represent the leaf node/perimeter. The concentric perimeters (e.g., like a stacking dolls model, etc.) the requestor may change to the security level of the first doll in order to discover the existence of the second doll—and so forth. For peer perimeters, even though each peer may operate at a different level, discovery of its existence is at the layer of the current perimeter that identifies the peers.

Variable Strength Automatic Escalation of Credentials for Automatic Escalation of Trust The requestor 805 may request more than one information resource in the course of a sequence of computations. The multiple information resources that are accessed may belong to different access levels within same access perimeter or may belong to different security perimeters and, in consequence, may be associated with different access levels. The MET credential facilitates simultaneous, seamless, access control on behalf of the requestor 805 across different information resources and security perimeters such as the first security perimeter 820 and the second security perimeter 825.

It may not be known ahead of time which specific information resources may be accessed during a sequence of computations. A MET credential that is created or extended on demand by performing the access determinations as the need arises just in time may be too expensive in latency because such a determination may require significant computation and communication by itself.

Alternatively, anticipating all possible information resources across different domains and pre-performing the access determinations to build comprehensive MET credentials may also be prohibitively expensive and non-scalable as the number of potential resources and security perimeters rises. For example, building comprehensive MET credentials would be like pre-purchasing multiple plane tickets to multiple cities in advance just in case one has to travel to any of them in the near future.

Pre-creating a MET token entirely in advance and employing it through the whole computation also incurs overhead because accesses now proceeds under the most demanding communication channel security provisions to satisfy the strongest protections that may be implied by the most conservative security properties for an access level encoded into the MET token.

To address the issues of latency and overhead waste introduced by just-in-time escalation and comprehensive MET token creation, the systems and techniques discussed herein use a predictive model to estimate the most likely access credentials need that are then encoded into a MET token. This reduces latency by pre-generating the MET token before the credential is needed with a limited set of credentials to reduce the overhead compared to a MET token that includes encoding all of the credentials.

The prediction model generator 835 generates a predictive model to determine when an authentication escalation (e.g., a MET credential expansion) may be necessary. The workloads of other tenants may be used by the prediction model generator to train/inform the predictive model. For example, requestors that run a statistical calculation workload may access information within the first security perimeter 820 and the second security perimeter 825. When a MET is being obtained, (e.g., being created or extended) a Multi-provider Edge Single-Sign-On Session Prediction (MESSOSP) may be performed.

The escalation predictor 840 may evaluate the requestor 805 and corresponding requestor 805 data using the predictive model generated by the prediction model generator to obtain outputs indicating the likelihood of escalation for access to predicted resources. For example, the requestor may be requesting access to the statistical calculation workload and the evaluation using the prediction model may generate output indicating that it is more likely than not that access to the first security perimeter 820 and the second security perimeter 825 will be used. Thresholds for predictions may be tuned to allow more credentials to be encoded which may increase overhead while reducing latency by reducing possible just-in-time escalation or to allow less credentials to be encoded to reduce overhead while possibly increasing latency because of possible just-in-time escalations. An initial strength of the MET token may be determined that is most likely to result in a completed execution of the workload thereby avoiding remediation steps. The token generator 845 may generate or update a MET token with the credentials predicted by the escalation predictor 840 as described above.

The remediator 850 may identify that a desired access may proceed but requires upgrading the channel security properties. The remediator may create a new channel with the desired properties and the access may proceed through the new channel. In an example, the remediator 850 may create a new training entry for the prediction model to be evaluated by the prediction model generator 835.

The remediator 850 may identify that a desired access cannot proceed with the current MET credential strength. The remediator 850 may request a security service to perform access determinations. For example, the remediator 850 may determine if the requestor 805, under the applicable trust relationships and contracts, may access this information resource and under what applicable access label and synthetic identity the requestor 805 may access the information resource. If the requestor 805 may access the resource, the remediator 850 may request that the token generator 845 to generate a new MET credential that encodes the additional access label and synthetic identity and the access may proceed. If the requestor 805 may not access the information resource, the remediator 850 may responding with an access denied notification. The remediator 850 may, create a training entry for retraining the prediction model by the prediction model generator 835.

The remediator 850 may de-escalate security by requesting that the token generator 845 regenerate a MET token with a reduced credential/access level set encoded within. De-escalation may be desirable in some situations in order to keep permitted high security accesses to short durations. MET credentials may be recreated for accessing sensitive information resources unless they arise in timely succession over short durations. For example, an secure sockets layer (SSL) connection to a medical database may time out quickly in order to limit the possibility that the device from which the access is being performed, if hijacked by some malicious entity, may leave information vulnerable to leakage. It is not necessary to recompute accessibility at a later time from scratch. Rather, a verification procedure is defined under which, if there are no security rules changes in the interim period between when de-escalation was performed and when an escalation step is needed, then a previously saved (e.g., cached) MET token may be installed/furnished. The prediction model may also be trained by the prediction model generator 835 for predicting such re-escalations.

A MET token generated based on output of the prediction model may be relevant when transitioning and arbitraging between domain providers. Training data may be developed and processed by the prediction model generator 835 to predict transitioning and synthetic identities for transitions ahead of time. Accordingly, per domain security controllers may create synthetic identities for expanding MET credentials, by the token generator 845, from a requestor 805 from another domain with minimum overhead.

In an example, before a service is needed, a fine-grained (e.g., detailed, etc.) escalation of services may be configured. The procedure of pre-creating a MET credential with sufficient initial strength by the token generator 845 may be sub-divided into a sequence in which MET credentials expand slowly and communication channel strengths are increased gradually. For example, an encryption key of 128-bit may be upgraded to an encryption key of 512-bit or 2048-bit. This may be similar to building a Markov Predictor that predicts a next state based on some number of previous states having been observed.

In an example, a protocol is provided for negotiating between an environment of the requestor 805 in the first security perimeter 820 and the information resource environments in the second security perimeter 825 to establish intermediaries through whom the access/channel properties may be brokered. For example, the environment of the requestor 805 may lack sufficient time or computational resources to expand the credentials and may propose a third-party service to an environment of the provider where the third-party service has the credentials. The third-party service may now act on behalf of the requestor 805 and the provider of the requested resource to facilitate delegated access.

In an example, a protocol may be provided for negotiating a set of interests to determine which entities are willing to give up their privacy or security for the interaction to happen. In an example, ranges of access labels may be used instead of a fixed access label. Accordingly, the information resource may be dynamically divided to only provide what is essential under a default access label and provide more sensitive information under a different, stricter, access label.

In another example, expensive access-determinations may be replaced by verifying proxy credentials to prove that X can access Y, furnish a signature by Z that X can access Y, where Z is a trusted intermediary for Y, who is expediting X's access to Y by taking responsibility for (e.g., indemnifying) X. Z may perform a challenge-response verification for the identity of A, which may be quicker and amortized over multiple escalations.

In yet another example, the requestor 805 may request information not covered by its MET token and the environment of the provider may identify a range of access labels under which the resource may be provided. Some access labels may permit access under a signature arrangement in which the environment of the requestor 805 facilitates immediate access over a portion of the content and thus limits the amount of privacy or security traded off for faster access. Under another access label, the access may be provided for very limited durations and capped in the number of reads permitted per unit of time to bound privacy loss. Under another access label, only the security channel properties may be lower in order to allow faster access without the need for a stronger channel, in response to the requestor asserting an emergency.

Figure 9:
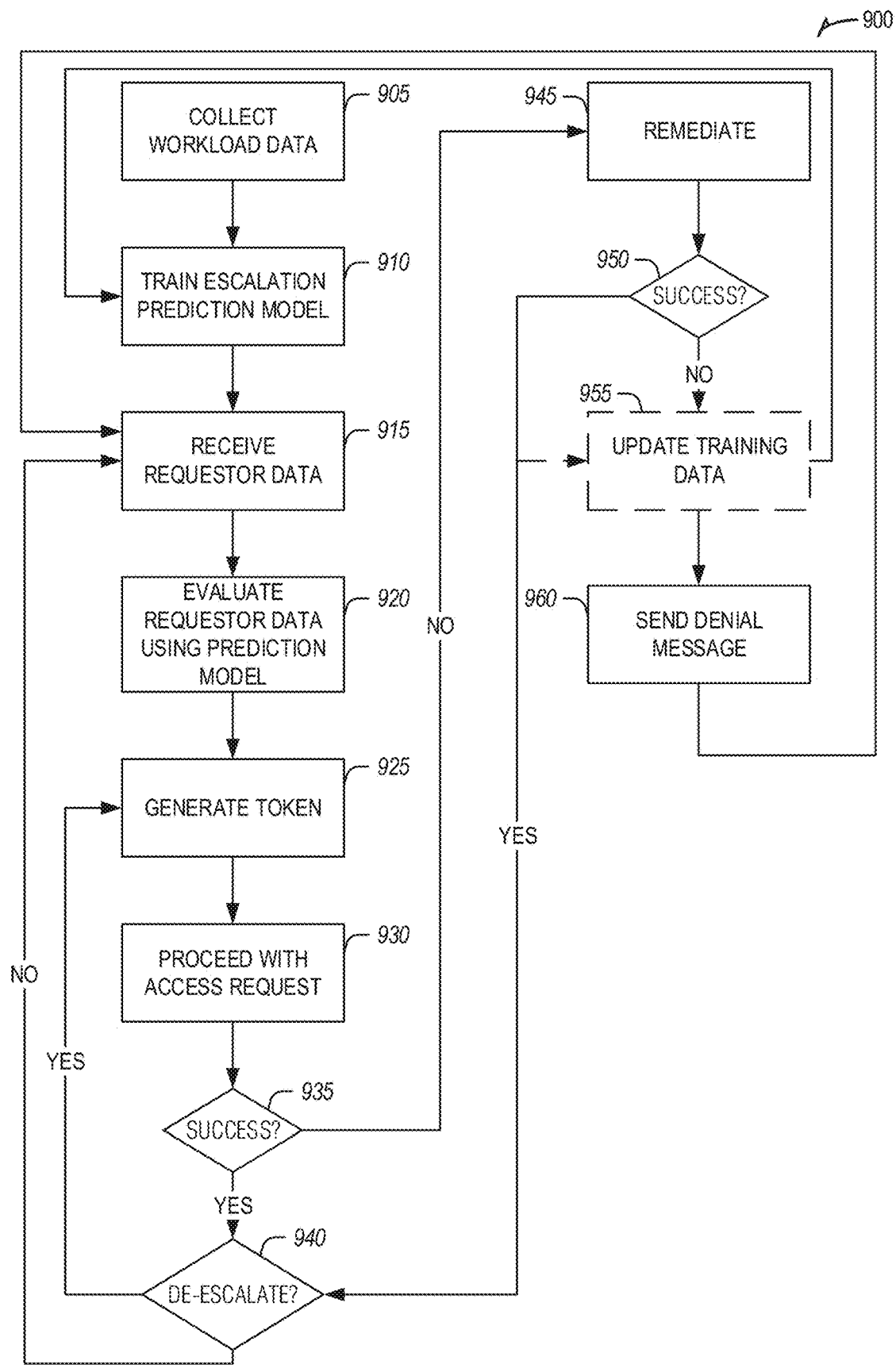
FIG. 9 illustrates a flow diagram of an example of a process for automatic escalation of trust credentials, according to an embodiment.

FIG. 9 illustrates a flow diagram of an example of a process 900 for automatic escalation of trust credentials, according to an embodiment. The process 900 may provide features as described in FIG. 8.

At operation 905, workload data may be collected for workloads operating on a network such as an edge network. The workload data may include information providers used in executing the workloads and corresponding security levels and configuration options.

At operation 910, a machine learning model may be trained using the workload data to develop an escalation prediction model that outputs probabilities of a requestor accessing a set of information resources based on requested or predicted workloads to be executed. The SLA/SLO and workload execution plan may define precisely which tasks of the workload will require which permissions. By training an AI model to spot anomalies with the permissions and tasks, it is possible to detect when orchestrators, planning, task schedulers, and other operational infrastructure are behaving improperly/inefficiently. This could be a sign that an attacker successfully compromised one of these entities and is staging an attack, before the actual damage is inflicted on the network.

At operation 915, requestor data may be received. The requestor data may include requested workloads, past workloads, patterns of workload execution etc. that describes usage parameters of the requestor that may be input into the escalation prediction model.

At operation 920, the requestor data may be evaluated using the escalation prediction model to determine credentials and security access levels and security configuration options for accessing the predicted information resources.

At operation 925, a multi-access token may be generated for the requestor. The multi-access token may include encoded credentials and security configuration options for accessing the information resources predicted to be accessed by the requestor. This provides the requestor with a pre-set token with credentials for resources that are expected to be accessed preventing escalation process from generating latency as the resources are accessed by reducing just-in-time processing of authentication escalation procedures.

If the prediction model shows an anomaly, it may be logged, reviewed offline, or may cause the flow to 925 to abort. While the process 900 doesn't show a decision box here, it may exist to support anomaly evaluation. The process 900 may be used to discover the connected assets including 'dark' assets in the network via trial-and-error. This might be used if the centrally managed list of resources are lost/destroyed and are to be re-built. Thus, the process 900 also represents a disaster recovery solution.

At operation 930, a predicted request may proceed as anticipated and the multi-access token may be transmitted to an information provider to access the information resource.

At decision 935, it may be determined if the request was successful. If the request was successful, it may be determined if the security credentials should be de-escalated at decision 940. For example, if the multi-access token includes access to highly sensitive data, the de-escalation process may regenerate a lower security token at operation 925.

If the request was not successful as determined at decision 935, remediation processes may be initiated at operation 945. For example, an alternate communication channel may be used to transmit the multi-access token, additional configuration options such as an access label and/or a synthetic identity may be encoded into the multi-access token. If the remediation is successful as determined at decision 950, training data may be updated at operation 955 and the process continues as described above at decision 940 to determine if de-escalation should be invoked. If the remediation is not successful as determined at decision 950, the training data may be updated at operation 955 and a denial message may be transmitted to the requestor at operation 960. The process continues to evaluate requestor data to determine whether adjustments should be made to the multi-access token at operation 915.

Figure 10:
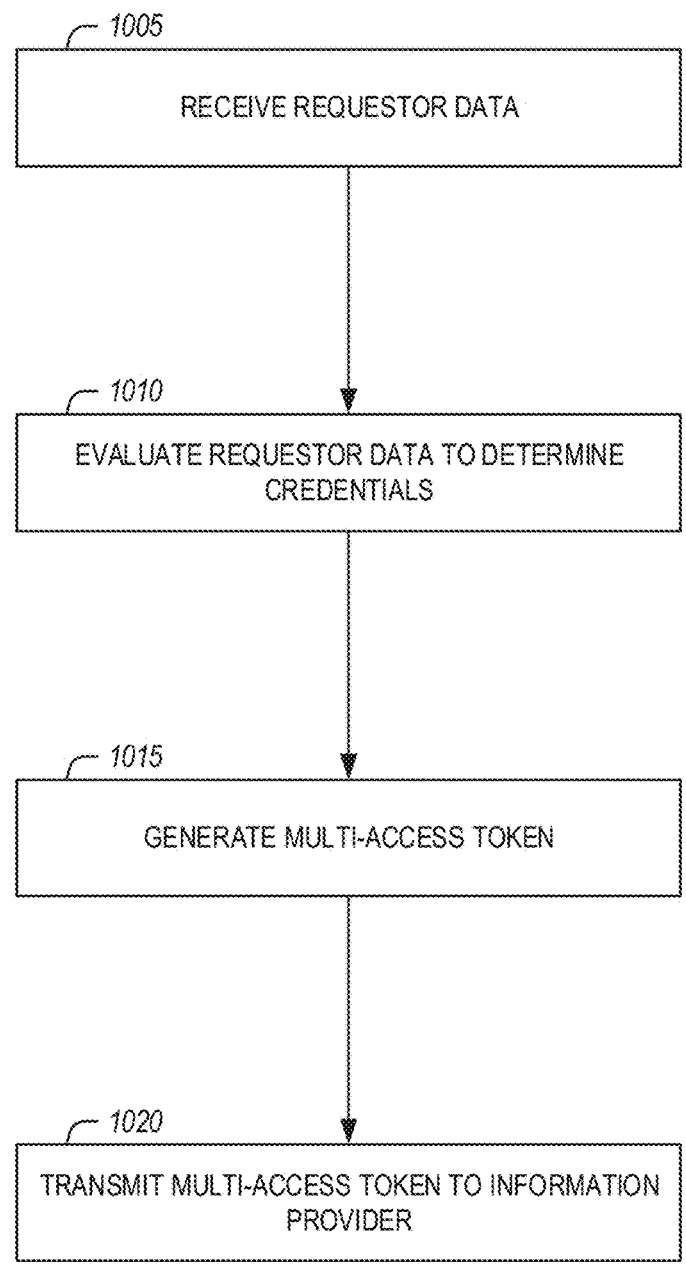
FIG. 10 illustrates an example of a method for automatic escalation of trust credentials, according to an embodiment.

FIG. 10 illustrates an example of a method 1000 for automatic escalation of trust credentials, according to an embodiment. The method 1000 may provide features as described in FIGS. 8 and 9.

At operation 1005, requestor data may be received (e.g., by the escalation predictor 840 as described in FIG. 8, etc.) that describes workloads of a requestor (e.g., the requestor 805 as described in FIG. 8, etc.).

At operation 1010, the requestor data may be evaluated (e.g., by the escalation predictor 840, etc.) using an escalation prediction model (e.g., as generated by the prediction model generator 835 as described in FIG. 8, etc.) to determine a set of trust credentials. In an example, a set of workload data may be obtained from a plurality of tenants of an edge network and a machine learning model may be trained using the set of workload data to generate the escalation prediction model. In an example, the set of workload data may include security parameters associated with each workload of the set of workloads. In an example, the security parameters may include at least one of a security perimeter or a security level corresponding to a workload.

In an example, determination of the set of trust credentials may include receipt of output from the evaluation of the requestor data using the escalation prediction model. In an example, the output may include a probability that the requestor will access a security perimeter. It may be determined that the probability is outside a threshold. A trust credential may be identified that is associated with the security perimeter and the trust credential may be added to the set of trust credentials. In an example, the set of trust credentials may include a proxy trust credential for a second security perimeter associated with a trust credential for a first security perimeter.

At operation 1015, a multi-access token may be generated (e.g., by the token generator 845 as described in FIG. 8, etc.) using the set of trust credentials. In an example, a new multi-access token may be generated for the requestor and the set of trust credentials may be encoded within the new multi-access token. In another example, an existing multi-access token may be obtained for the requestor. The set of trust credentials may be encoded and the encoded set of trust credentials may be appended to the existing multi-access token for the requestor. In an example, an existing encoded set of trust credentials may be removed from the existing multi-access token.

At operation 1020, the multi-access token may be transmitted to an information provider to fulfill a request of the requestor. In an example, a communication channel for communication with the information provider may be identified based on a security level associated with a trust credential of the set of trust credentials. The multi-access token may be transmitted to the information provider via the communication channel.

In an example, it may be determined that the request cannot be fulfilled using the multi-access token. An alternate communication channel may be identified for the information provider and the multi-access token may be transmitted via the alternate communication channel.

In another example, it may be determined that the request cannot be fulfilled using the multi-access token. An access label and a synthetic identity may be identified for accessing the information provider. The access label and the synthetic identity may be encoded, and the multi-access token may be retransmitted to the information provider.

In yet another example, it may be determined that the request cannot be fulfilled using the multi-access token. A response may be transmitted to the request indicating that access is denied and training data used to train the escalation prediction model may be updated.

Additional Notes & Examples

Example 1 is a system for predictive multi-access token generation comprising: at least one processor; and memory including instructions that, when executed by the at least one processor, cause the at least one processor to perform operations to: receive requestor data that describes workloads of a requestor, wherein a description of a workload includes, at least one attribute of the workload; determine a set of trust credentials by using an escalation prediction model to evaluate the requestor data; assemble the multi-access token from the set of trust credentials; and transmit the multi-access token to an information provider to fulfill a subsequent request of the requestor.

In Example 2, the subject matter of Example 1 includes, wherein the at least one attribute is a security perimeter name, security perimeter discovery service, security perimeter service, security perimeter security level, security perimeter group, security perimeter sub-group, security perimeter resource, or security perimeter data pool.

In Example 3, the subject matter of Examples 1-2 includes, the memory further comprising instructions that cause the at least one processor to perform operations to: obtain a set of workload data from a plurality of tenants of an edge computing network: and train a machine learning model using the set of workload data to generate the escalation prediction model.

In Example 4, the subject matter of Example 3 includes, wherein the set of workload data includes security parameters associated with tenant workloads corresponding to the set of workload data.

In Example 5, the subject matter of Example 4 includes, wherein the security parameters include at least one of a security perimeter or a security level corresponding to a tenant workload of the tenant workloads.

In Example 6, the subject matter of Examples 1-5 includes, the instructions to determine the set of trust credentials further comprising instructions to: receive output from the evaluation of the requestor data using the escalation prediction model, the output including a probability that the requestor will access a security perimeter; determine that the probability is outside a threshold; identify a trust credential associated with the security perimeter; and add the trust credential to the set of trust credentials.

In Example 7, the subject matter of Examples 1-6 includes, the memory further comprising instructions that cause the at least one processor to perform operations to: identify a communication channel for communication with the information provider based on a security level associated with a trust credential of the set of trust credentials; and transmit the multi-access token to the information provider via the communication channel.

In Example 8, the subject matter of Examples 1-7 includes, the instructions to assemble the multi-access token further comprising instructions to: generate a new multi-access token for the requestor; and encode the set of trust credentials within the new multi-access token.

In Example 9, the subject matter of Examples 1-8 includes, the instructions to assemble the multi-access token further comprising instructions to: obtain an existing multi-access token for the requestor; encode the set of trust credentials; and append the encoded set of trust credentials to the existing multi-access token for the requestor.

In Example 10, the subject matter of Example 9 includes, the memory further comprising instructions that cause the at least one processor to perform operations to: remove an existing encoded set of trust credentials from the existing multi-access token.

In Example 11, the subject matter of Examples 1-10 includes, wherein the set of trust credentials includes a proxy trust credential for a second security perimeter associated with a trust credential for a first security perimeter.

In Example 12, the subject matter of Examples 1-11 includes, the memory further comprising instructions that cause the at least one processor to perform operations to: determine that the request cannot be fulfilled using the multi-access token; identify an alternate communication channel for the information provider; and transmit the multi-access token via the alternate communication channel.

In Example 13, the subject matter of Examples 1-12 includes, the memory further comprising instructions that cause the at least one processor to perform operations to: determine that the request cannot be fulfilled using the multi-access token; identify an access label and a synthetic identity for accessing the information provider; encode the access label and the synthetic identity; and retransmit the multi-access token to the information provider.

In Example 14, the subject matter of Examples 1-13 includes, the memory further comprising instructions that cause the at least one processor to perform operations to: determine that the request cannot be fulfilled using the multi-access token; transmit a response to the request indicating that access is denied; and update training data used to train the escalation prediction model.

Example 15 is at least one non-transitory machine-readable memory including instructions for predictive multi-access token generation that, when executed by at least one processor, cause the at least one processor to perform operations to: receive requestor data that describes workloads of a requestor, wherein a description of a workload includes, at least one attribute of the workload; determine a set of trust credentials by using an escalation prediction model to evaluate the requestor data; assemble the multi-access token from the set of trust credentials; and transmit the multi-access token to an information provider to fulfill a subsequent request of the requestor.

In Example 16, the subject matter of Example 15 includes, wherein the at least one attribute is a security perimeter name, security perimeter discovery service, security perimeter service, security perimeter security level, security perimeter group, security perimeter sub-group, security perimeter resource, or security perimeter data pool.

In Example 17, the subject matter of Examples 15-16 includes, instructions that cause the at least one processor to perform operations to: obtain a set of workload data from a plurality of tenants of an edge computing network; and train a machine learning model using the set of workload data to generate the escalation prediction model.

In Example 18, the subject matter of Example 17 includes, wherein the set of workload data includes security parameters associated with tenant workloads corresponding to the set of workload data.

In Example 19, the subject matter of Example 18 includes, wherein the security parameters include at least one of a security perimeter or a security level corresponding to a tenant workload of the tenant workloads.

In Example 20, the subject matter of Examples 15-19 includes, the instructions to determine the set of trust credentials further comprising instructions to: receive output from the evaluation of the requestor data using the escalation prediction model, the output including a probability that the requestor will access a security perimeter; determine that the probability is outside a threshold; identify a trust credential associated with the security perimeter; and add the trust credential to the set of trust credentials.

In Example 21, the subject matter of Examples 15-20 includes, instructions that cause the at least one processor to perform operations to: identify a communication channel for communication with the information provider based on a security level associated with a trust credential of the set of trust credentials; and transmit the multi-access token to the information provider via the communication channel.

In Example 22, the subject matter of Examples 15-21 includes, the instructions to assemble the multi-access token further comprising instructions to: generate a new multi-access token for the requestor; and encode the set of trust credentials within the new multi-access token.

In Example 23, the subject matter of Examples 15-22 includes, the instructions to assemble the multi-access token further comprising instructions to: obtain an existing multi-access token for the requestor; encode the set of trust credentials; and append the encoded set of trust credentials to the existing multi-access token for the requestor.

In Example 24, the subject matter of Example 23 includes, instructions that cause the at least one processor to perform operations to: remove an existing encoded set of trust credentials from the existing multi-access token.

In Example 25, the subject matter of Examples 15-24 includes, wherein the set of trust credentials includes a proxy trust credential for a second security perimeter associated with a trust credential for a first security perimeter.

In Example 26, the subject matter of Examples 15-25 includes, instructions that cause the at least one processor to perform operations to: determine that the request cannot be fulfilled using the multi-access token; identify an alternate communication channel for the information provider; and transmit the multi-access token via the alternate communication channel.

In Example 27, the subject matter of Examples 15-26 includes, instructions that cause the at least one processor to perform operations to: determine that the request cannot be fulfilled using the multi-access token; identify an access label and a synthetic identity for accessing the information provider; encode the access label and the synthetic identity; and retransmit the multi-access token to the information provider.

In Example 28, the subject matter of Examples 15-27 includes, instructions that cause the at least one processor to perform operations to: determine that the request cannot be fulfilled using the multi-access token; transmit a response to the request indicating that access is denied; and update training data used to train the escalation prediction model.

Example 29 is a method for predictive multi-access token generation comprising: receiving requestor data that describes workloads of a requestor, wherein a description of a workload includes, at least one attribute of the workload; determining a set of trust credentials by using an escalation prediction model to evaluate the requestor data; assembling the multi-access token from the set of trust credentials; and transmitting the multi-access token to an information provider to fulfill a subsequent request of the requestor.

In Example 30, the subject matter of Example 29 includes, wherein the at least one attribute is a security perimeter name, security perimeter discovery service, security perimeter service, security perimeter security level, security perimeter group, security perimeter sub-group, security perimeter resource, or security perimeter data pool.

In Example 31, the subject matter of Examples 29-30 includes, obtaining a set of workload data from a plurality of tenants of an edge computing network; and training a machine learning model using the set of workload data to generate the escalation prediction model.

In Example 32, the subject matter of Example 31 includes, wherein the set of workload data includes security parameters associated with tenant workloads corresponding to the set of workload data.

In Example 33, the subject matter of Example 32 includes, wherein the security parameters include at least one of a security perimeter or a security level corresponding to a tenant workload of the tenant workloads.

In Example 34, the subject matter of Examples 29-33 includes, wherein determining the set of trust credentials further comprises: receiving output from the evaluation of the requestor data using the escalation prediction model, the output including a probability that the requestor will access a security perimeter; determining that the probability is outside a threshold; identifying a trust credential associated with the security perimeter; and adding the trust credential to the set of trust credentials.

In Example 35, the subject matter of Examples 29-34 includes, identifying a communication channel for communication with the information provider based on a security level associated with a trust credential of the set of trust credentials; and transmitting the multi-access token to the information provider via the communication channel.

In Example 36, the subject matter of Examples 29-35 includes, wherein assembling the multi-access token further comprises: generating a new multi-access token for the requestor; and encoding the set of trust credentials within the new multi-access token.

In Example 37, the subject matter of Examples 29-36 includes, wherein assembling the multi-access token further comprises: obtaining an existing multi-access token for the requestor; encoding the set of trust credentials; and appending the encoded set of trust credentials to the existing multi-access token for the requestor.

In Example 38, the subject matter of Example 37 includes, removing an existing encoded set of trust credentials from the existing multi-access token.

In Example 39, the subject matter of Examples 29-38 includes, wherein the set of trust credentials includes a proxy trust credential for a second security perimeter associated with a trust credential for a first security perimeter.

In Example 40, the subject matter of Examples 29-39 includes, determining that the request cannot be fulfilled using the multi-access token; identifying an alternate communication channel for the information provider; and transmitting the multi-access token via the alternate communication channel.

In Example 41, the subject matter of Examples 29-40 includes, determining that the request cannot be fulfilled using the multi-access token; identifying an access label and a synthetic identity for accessing the information provider; encoding the access label and the synthetic identity; and retransmitting the multi-access token to the information provider.

In Example 42, the subject matter of Examples 29-41 includes, determining that the request cannot be fulfilled using the multi-access token; transmitting a response to the request indicating that access is denied; and updating training data used to train the escalation prediction model.

Example 43 is at least one machine-readable medium including instructions that, when executed by a machine, cause the machine to perform any method of Examples 29-42.

Example 44 is a system comprising means to perform any method of Examples 29-42.

Example 45 is a system for predictive multi-access token generation comprising: means for receiving requestor data that describes workloads of a requestor, wherein a description of a workload includes, at least one attribute of the workload; means for determining a set of trust credentials by using an escalation prediction model to evaluate the requestor data; means for assembling the multi-access token from the set of trust credentials; and means for transmitting the multi-access token to an information provider to fulfill a subsequent request of the requestor.

In Example 46, the subject matter of Example 45 includes, wherein the at least one attribute is a security perimeter name, security perimeter discovery service, security perimeter service, security perimeter security level, security perimeter group, security perimeter sub-group, security perimeter resource, or security perimeter data pool.

In Example 47, the subject matter of Examples 45-46 includes, means for obtaining a set of workload data from a plurality of tenants of an edge computing network; and means for training a machine learning model using the set of workload data to generate the escalation prediction model.

In Example 48, the subject matter of Example 47 includes, wherein the set of workload data includes security parameters associated with tenant workloads corresponding to the set of workload data.

In Example 49, the subject matter of Example 48 includes, wherein the security parameters include at least one of a security perimeter or a security level corresponding to a tenant workload of the tenant workloads.

In Example 50, the subject matter of Examples 45-49 includes, wherein the means for determining the set of trust credentials further comprises: means for receiving output from the evaluation of the requestor data using the escalation prediction model, the output including a probability that the requestor will access a security perimeter; means for determining that the probability is outside a threshold; means for identifying a trust credential associated with the security perimeter; and means for adding the trust credential to the set of trust credentials.

In Example 51, the subject matter of Examples 45-50 includes, means for identifying a communication channel for communication with the information provider based on a security level associated with a trust credential of the set of trust credentials; and means for transmitting the multi-access token to the information provider via the communication channel.

In Example 52, the subject matter of Examples 45-51 includes, wherein the means for assembling the multi-access token further comprises: means for generating a new multi-access token for the requestor; and means for encoding the set of trust credentials within the new multi-access token.

In Example 53, the subject matter of Examples 45-52 includes, wherein the means for assembling the multi-access token further comprises: means for obtaining an existing multi-access token for the requestor; means for encoding the set of trust credentials; and means for appending the encoded set of trust credentials to the existing multi-access token for the requestor.

In Example 54, the subject matter of Example 53 includes, means for removing an existing encoded set of trust credentials from the existing multi-access token.

In Example 55, the subject matter of Examples 45-54 includes, wherein the set of trust credentials includes a proxy trust credential for a second security perimeter associated with a trust credential for a first security perimeter.

In Example 56, the subject matter of Examples 45-55 includes, means for determining that the request cannot be fulfilled using the multi-access token; means for identifying an alternate communication channel for the information provider; and means for transmitting the multi-access token via the alternate communication channel.

In Example 57, the subject matter of Examples 45-56 includes, means for determining that the request cannot be fulfilled using the multi-access token; means for identifying an access label and a synthetic identity for accessing the information provider; means for encoding the access label and the synthetic identity; and means for retransmitting the multi-access token to the information provider.

In Example 58, the subject matter of Examples 45-57 includes, means for determining that the request cannot be fulfilled using the multi-access token; means for transmitting a response to the request indicating that access is denied; and means for updating training data used to train the escalation prediction model.

Example 59 is at least one machine-readable medium including instructions that, when executed by processing circuitry, cause the processing circuitry to perform operations to implement of any of Examples 1-58.

Example 60 is an apparatus comprising means to implement of any of Examples 1-58.

Example 61 is a system to implement of any of Examples 1-58.

Example 62 is a method to implement of any of Examples 1-58.

Example 63 is an apparatus of an edge computing system comprising: one or more processors and one or more computer-readable media comprising instructions that, when executed by the one or more processors, cause the one or more processors to perform any of the methods of Examples 1-58.

Example 64 is one or more computer-readable storage media comprising instructions to cause an electronic device of an edge computing system, upon execution of the instructions by one or more processors of the electronic device, to perform any of the predictive multi-access token generation methods of Examples 1-58.

Example 65 is a computer program used in an edge computing system, the computer program comprising instructions, wherein execution of the program by a processing element in the edge computing system is to cause the processing element to perform any of the predictive multi-access token generation methods of Examples 1-58.

Example 66 is an edge computing appliance device operating as a self-contained processing system, comprising a housing, case or shell, network communication circuitry, storage memory circuitry, and processor circuitry, adapted to perform any of the predictive multi-access token generation methods of Examples 1-58.

Example 67 is an apparatus of an edge computing system comprising means to perform any of the predictive multi-access token generation methods of Examples 1-58.

Example 68 is an apparatus of an edge computing system comprising logic, modules, or circuitry to perform any of the predictive multi-access token generation methods of Examples 1-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for predictive multi-access token generation comprising:
    at least one processor; and
    memory including instructions that, when executed by the at least one processor, cause the at least one processor to perform operations to:
        receive requestor data that describes workloads of a requestor, wherein a description of a workload includes at least one attribute of the workload;
        determine a set of trust credentials by using an escalation prediction model to evaluate the requestor data;
        assemble the multi-access token from the set of trust credentials; and
        transmit the multi-access token to an information provider to fulfill a subsequent request of the requestor.

2. The system of claim 1, wherein the at least one attribute is a security perimeter name, security perimeter discovery service, security perimeter service, security perimeter security level, security perimeter group, security perimeter subgroup, security perimeter resource, or security perimeter data pool.

3. The system of claim 1, the memory further comprising instructions that cause the at least one processor to perform operations to:
    obtain a set of workload data from a plurality of tenants of an edge computing network; and
    train a machine learning model using the set of workload data to generate the escalation prediction model.

4. The system of claim 1, the instructions to determine the set of trust credentials further comprising instructions to:
    receive output from the evaluation of the requestor data using the escalation prediction model, the output including a probability that the requestor will access a security perimeter;
    determine that the probability is outside a threshold;
    identify a trust credential associated with the security perimeter; and
    add the trust credential to the set of trust credentials.

5. The system of claim 1, the memory further comprising instructions that cause the at least one processor to perform operations to:
    identify a communication channel for communication with the information provider based on a security level associated with a trust credential of the set of trust credentials; and
    transmit the multi-access token to the information provider via the communication channel.

6. The system of claim 1, the instructions to assemble the multi-access token further comprising instructions to:
    generate a new multi-access token for the requestor; and
    encode the set of trust credentials within the new multi-access token.

7. The system of claim 1, the memory further comprising instructions that cause the at least one processor to perform operations to:
    determine that the request cannot be fulfilled using the multi-access token;
    identify an alternate communication channel for the information provider, and
    transmit the multi-access token via the alternate communication channel.

8. The system of claim 1, the memory further comprising instructions that cause the at least one processor to perform operations to:
  determine that the request cannot be fulfilled using the multi-access token;
  identify an access label and a synthetic identity for accessing the information provider;
  encode the access label and the synthetic identity; and
  retransmit the multi-access token to the information provider.

9. The system of claim 1, the memory further comprising instructions that cause the at least one processor to perform operations to:
  determine that the request cannot be fulfilled using the multi-access token;
  transmit a response to the request indicating that access is denied; and
  update training data used to train the escalation prediction model.

10. At least one non-transitory machine-readable memory including instructions for predictive multi-access token generation that, when executed by at least one processor, cause the at least one processor to perform operations to:
  receive requestor data that describes workloads of a requestor, wherein a description of a workload includes at least one attribute of the workload;
  determine a set of trust credentials by using an escalation prediction model to evaluate the requestor data;
  assemble the multi-access token from the set of trust credentials; and
  transmit the multi-access token to an information provider to fulfill a subsequent request of the requestor.

11. The at least one non-transitory machine-readable memory of claim 10, further comprising instructions that cause the at least one processor to perform operations to:
  obtain a set of workload data from a plurality of tenants of an edge computing network; and
  train a machine learning model using the set of workload data to generate the escalation prediction model.

12. The at least one non-transitory machine-readable memory of claim 11, wherein the set of workload data includes security parameters associated with tenant workloads corresponding to the set of workload data.

13. The at least one non-transitory machine-readable memory of claim 12, wherein the security parameters include at least one of a security perimeter or a security level corresponding to a tenant workload of the tenant workloads.

14. The at least one non-transitory machine-readable memory of claim 10, the instructions to determine the set of trust credentials further comprising instructions to:
  receive output from the evaluation of the requestor data using the escalation prediction model, the output including a probability that the requestor will access a security perimeter;
  determine that the probability is outside a threshold;
  identify a trust credential associated with the security perimeter; and
  add the trust credential to the set of trust credentials.

15. The at least one non-transitory machine-readable memory of claim 10, further comprising instructions that cause the at least one processor to perform operations to:
  determine that the request cannot be fulfilled using the multi-access token;
  identify an alternate communication channel for the information provider; and
  transmit the multi-access token via the alternate communication channel.

16. The at least one non-transitory machine-readable memory of claim 10, further comprising instructions that cause the at least one processor to perform operations to:
  determine that the request cannot be fulfilled using the multi-access token;
  identify an access label and a synthetic identity for accessing the information provider;
  encode the access label and the synthetic identity; and
  retransmit the multi-access token to the information provider.

17. The at least one non-transitory machine-readable memory of claim 10, further comprising instructions that cause the at least one processor to perform operations to:
  determine that the request cannot be fulfilled using the multi-access token;
  transmit a response to the request indicating that access is denied; and
  update training data used to train the escalation prediction model.

18. A method for predictive multi-access token generation comprising:
  receiving requestor data that describes workloads of a requestor, wherein a description of a workload includes at least one attribute of the workload;
  determining a set of trust credentials by using an escalation prediction model to evaluate the requestor data;
  assembling the multi-access token from the set of trust credentials; and
  transmitting the multi-access token to an information provider to fulfill a subsequent request of the requestor.

19. The method of claim 18, further comprising:
  obtaining a set of workload data from a plurality of tenants of an edge computing network; and
  training a machine learning model using the set of workload data to generate the escalation prediction model.

20. The method of claim 18, wherein determining the set of trust credentials further comprises:
  receiving output from the evaluation of the requestor data using the escalation prediction model, the output including a probability that the requestor will access a security perimeter;
  determining that the probability is outside a threshold;
  identifying a trust credential associated with the security perimeter; and
  adding the trust credential to the set of trust credentials.

21. The method of claim 18, further comprising:
  identifying a communication channel for communication with the information provider based on a security level associated with a trust credential of the set of trust credentials; and
  transmitting the multi-access token to the information provider via the communication channel.

22. The method of claim 18, wherein assembling the multi-access token further comprises:
  obtaining an existing multi-access token for the requestor;
  encoding the set of trust credentials; and
  appending the encoded set of trust credentials to the existing multi-access token for the requestor.

23. The method of claim 18, further comprising:
  determining that the request cannot be fulfilled using the multi-access token;
  identifying an alternate communication channel for the information provider, and
  transmitting the multi-access token via the alternate communication channel.

24. The method of claim 18, further comprising:
determining that the request cannot be fulfilled using the multi-access token;
identifying an access label and a synthetic identity for accessing the information provider;
encoding the access label and the synthetic identity; and
retransmitting the multi-access token to the information provider.

* * * * *